United States Patent
Richards et al.

(10) Patent No.: US 10,712,775 B2
(45) Date of Patent: Jul. 14, 2020

(54) DICHROIC COMBINER BACKLIGHT USED IN A HEAD MOUNTED DISPLAY

(71) Applicant: Facebook Technologies, LLC, Menlo Park, CA (US)

(72) Inventors: Evan M. Richards, Santa Clara, CA (US); Shie Ping Jeffrey Tseng, Los Altos, CA (US); Jianru Shi, Union City, CA (US); Yue Shi, Santa Clara, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 161 days.

(21) Appl. No.: 15/370,649

(22) Filed: Dec. 6, 2016

(65) Prior Publication Data

US 2018/0157053 A1    Jun. 7, 2018

(51) Int. Cl.
  *G06F 1/16* (2006.01)
  *F21V 8/00* (2006.01)
  *G02F 1/13357* (2006.01)
  *G02B 27/01* (2006.01)

(52) U.S. Cl.
  CPC ........... *G06F 1/163* (2013.01); *G02B 6/0068* (2013.01); *G02B 6/0073* (2013.01); *G02B 27/0172* (2013.01); *G02F 1/133615* (2013.01); *G02F 1/133621* (2013.01); *G02B 2027/0114* (2013.01)

(58) Field of Classification Search
  CPC . G02B 27/1006; G02B 6/0068; G02B 6/0088
  See application file for complete search history.

(56) References Cited

U.S. PATENT DOCUMENTS

| 4,721,368 | A  | * | 1/1988  | Deguchi ........... | G11B 11/10532<br>359/484.04 |
|---|---|---|---|---|---|
| 2005/0259441 | A1 | * | 11/2005 | Arai ..................... | G02B 6/0028<br>362/613 |
| 2008/0151356 | A1 | * | 6/2008  | Fujita ..................... | G09G 3/007<br>359/298 |
| 2008/0205077 | A1 | * | 8/2008  | Lenderink .......... | G02B 27/0905<br>362/555 |
| 2011/0277361 | A1 | * | 11/2011 | Nichol ................. | G02B 6/0018<br>40/541 |
| 2012/0250026 | A1 | * | 10/2012 | Boer ................... | G03F 7/70775<br>356/487 |
| 2013/0214998 | A1 | * | 8/2013  | Andes .................. | G02B 27/017<br>345/8 |

(Continued)

*Primary Examiner* — Edmond C Lau
*Assistant Examiner* — Jonathan Y Jung
(74) *Attorney, Agent, or Firm* — Fenwick & West LLP

(57) ABSTRACT

A liquid crystal display (LCD) device including a backlight with an LED assembly. The LED assembly includes a dichroic combiner and two or more different color LEDs. A substrate of the dichroic combiner receives color light from multiple color LEDs at different input regions and propagating in different directions. Dielectric layers within the substrate selectively reflect or transmit the color light to spatially superimpose the color light, and output the color light in a particular direction at a light output region of the substrate. The light output regions of LED assemblies are arranged behind an LCD panel, along one or more edges, to illuminate the LCD panel. The LED assembly provides edge-lighting without requiring LED placement along the one or more edges.

25 Claims, 12 Drawing Sheets

(56) References Cited

U.S. PATENT DOCUMENTS

| | | | |
|---|---|---|---|
| 2013/0287337 A1* | 10/2013 | Kuo | G02B 6/2817 385/24 |
| 2014/0036204 A1* | 2/2014 | Doyle | G02B 6/002 349/65 |
| 2015/0253487 A1* | 9/2015 | Nichol | G02B 6/0036 362/610 |
| 2016/0011422 A1* | 1/2016 | Thurber | G02B 27/64 345/8 |

* cited by examiner

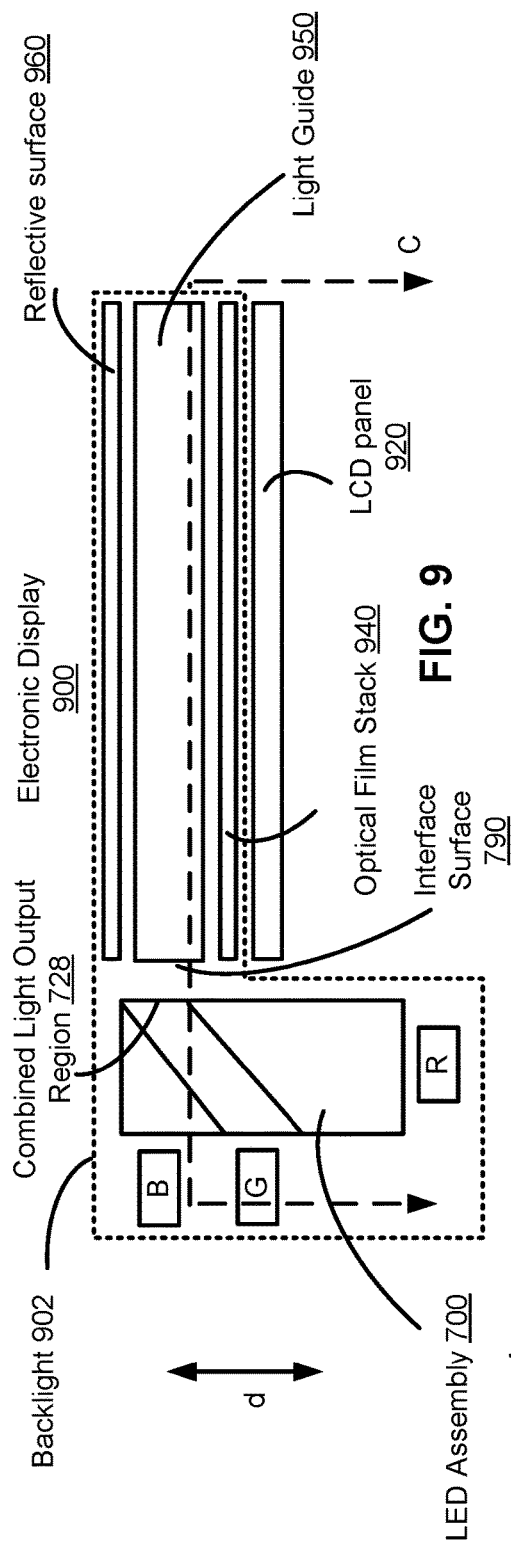
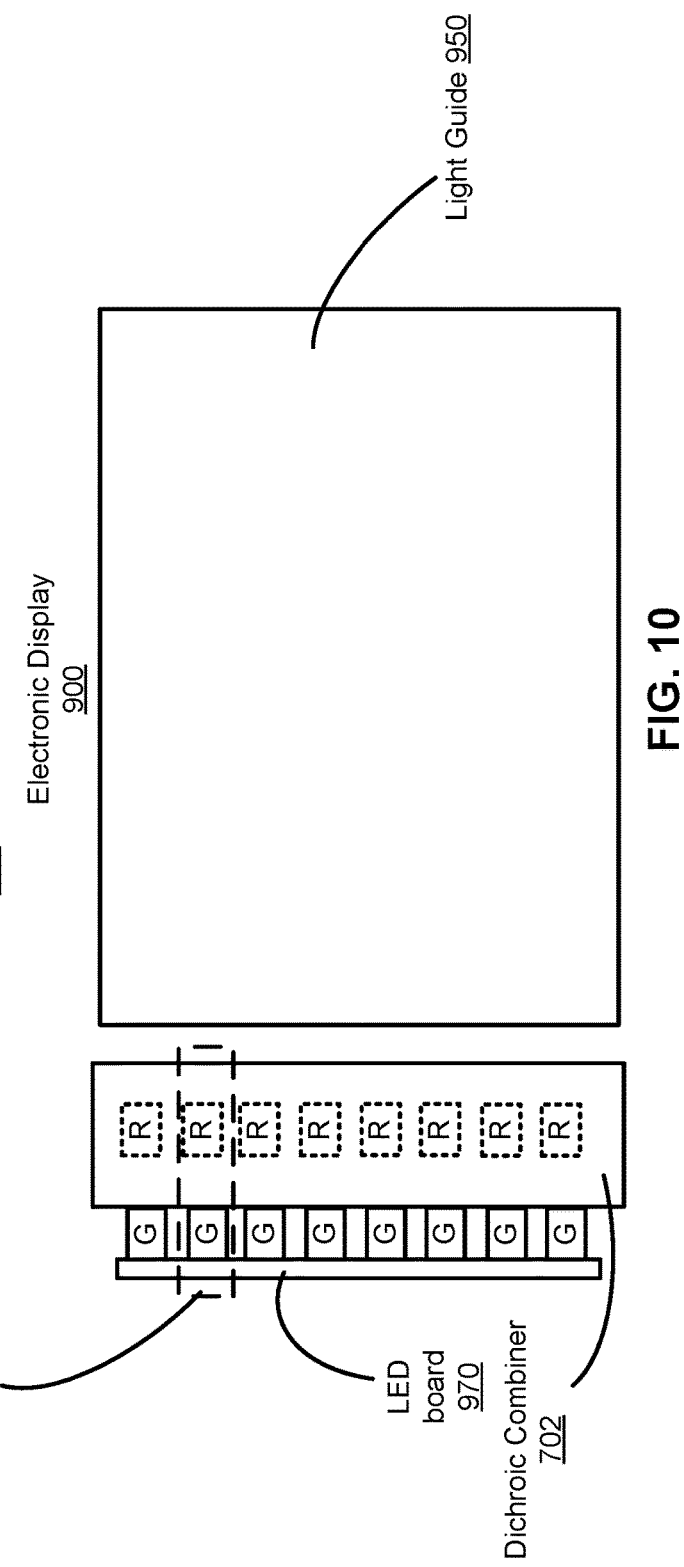

1400

Determine a first emission spectrum of a first color LED of a LED assembly and a second emission spectrum of a second color LED of the LED assembly
1410

Determine a first emission response time of the first color LED and a second emission response time of the second color LED
1420

Control the first emission spectrum of the first color LED relative to the second emission spectrum of the second color LED
1430

Control the first emission response time of the first color LED relative to the second emission response time of the second LED
1440

FIG. 14

DICHROIC COMBINER BACKLIGHT USED IN A HEAD MOUNTED DISPLAY

BACKGROUND

Edge-lit backlights provide illumination for pixels of liquid crystal displays (LCDs) to provide images on the LCD. These backlights may include a single layer of white LEDs arranged along an edge of a light guide. The light guide receives light from the white LEDs and attempts to direct the light evenly to pixels of the LCD panel of the electronic display. The single layer of white LEDs provides light having limited color gamut and brightness, making them less desirable for use as light sources for backlights for head mounted displays (HMDs).

SUMMARY

A liquid crystal display (LCD) device including a backlight LED assemblies including dichroic combiners. The LCD device includes an LCD panel and a backlight for illuminating the LCD panel. The backlight includes an LED assembly and a light guide. The LED assemblies include color LEDs that serve as light sources for the backlight.

The LED assembly includes: a first color LED emitting a first light at a first wavelength; a second color LED emitting a second light at a second wavelength; and a third LED emitting a third light at a third wavelength. The LED assembly further includes a dichroic combiner, including: a substrate to propagate the first, second, and third light, the substrate including: a first color light input region to receive the first light from the first color LED; a second color light input regions to receive the second light from the second color LED; a third color light input region to receive the third light from the third color LED; and a light output region to output the first, second, and third light at a first direction, the light output region disposed behind the LCD panel along an edge of the LCD panel.

The dichroic combiner further includes a first dielectric layer disposed within the substrate, the first dielectric layer configured to: receive the first light propagating at a second direction from the first color light input region of the substrate; transmit the first light propagating at the second direction to a second dielectric layer; receive the second light propagating at a third direction from the second color light input region of the substrate; and reflect the second light to propagate at the second direction to the second dielectric layer.

The dichroic combiner further includes the second dielectric layer disposed within the substrate, the second dielectric layer configured to: receive the first light propagating at the second direction from the first dielectric layer; reflect the first light to propagate at the first direction to the light output region; receive the second light reflected from the first dielectric layer propagating at the second direction; reflect the second light to propagate at the first direction to the light output region; receive the third light propagating at the first direction from the third light input region of the substrate; and transmit the third light at the first direction to the light output region.

The backlight further includes a light guide configured to: combine the first light, second light, and third light received from the light output region of the dichroic combiner into combined light to illuminate the LCD panel; and direct the combined light to the pixels of the LCD panel.

Some embodiments include a head-mounted display (HMD) including an LCD device including a backlight with LED assemblies.

BRIEF DESCRIPTION OF THE DRAWINGS

FIG. 9 shows a cross sectional side view of an electronic display, in accordance with some embodiments.

FIG. 10 shows a front view of the electronic display, in accordance with some embodiments.

FIG. 14 shows a flow chart of a process for controlling an LED assembly of a backlight, in accordance with some embodiments The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

Techniques for providing a backlight optimized for head-mounted displays (HMD) are discussed herein. The backlight is disposed behind a liquid crystal display (LCD) device along a thickness dimension to illuminate the pixels of an LCD panel. The backlight includes an LED assembly that serves as a lighting source for the backlight. The LED assembly includes a dichroic combiner and two or more different color LEDs.

A substrate of the dichroic combiner receives color light from multiple color LEDs at different input regions of the substrate, and propagating in different directions. Dielectric layers within the substrate selectively reflect or transmit the color light to spatially superimpose the color light, and output the color light in a particular direction at a light output region of the substrate.

The light output regions of multiple LED assemblies are arranged behind an LCD panel, along one or more edges, to illuminate the LCD panel. For example, the light output regions of the LED assemblies may be arranged in an array along an edge of a light guide that directs the light to pixels of the LCD panel. The LED assembly provides edge-lighting without requiring direct LED placement along the one or more edges.

In some embodiments, multiple LEDs of the same color may be optically coupled with a dichroic combiner to increase brightness of the backlight. In some embodiments, the color LEDs of the LED assembly include a red color LED, a blue color LED, and a green color LED. The dichroic combiner homogenizes and spatially superimposes the color light prior to output to the light guide.

System Overview

Figure 1:
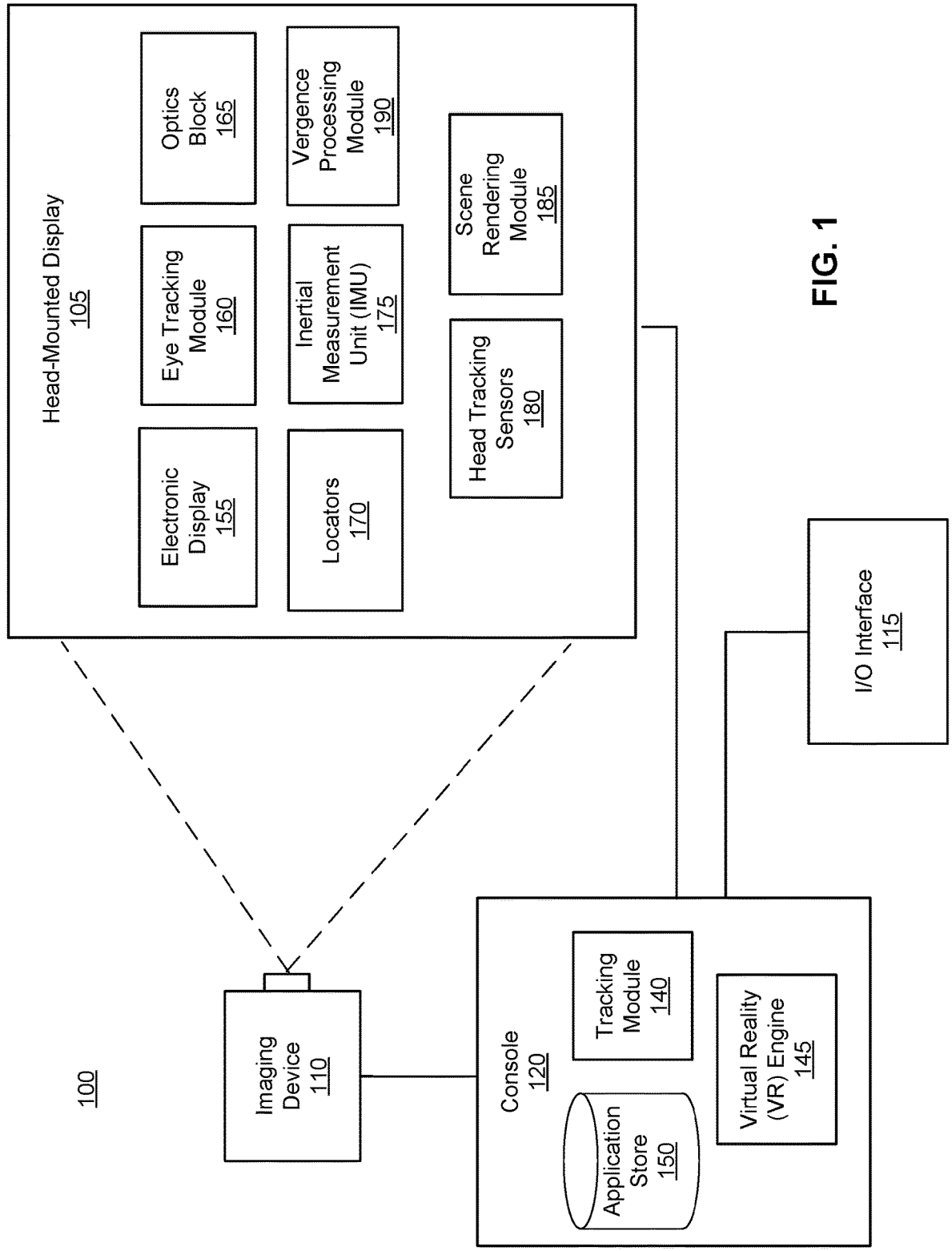
FIG. 1 shows a system, in accordance with some embodiments.

FIG. 1 shows a system 100 including a head-mounted display (HMD). The system 100 may be for use as a virtual reality (VR) system, an augmented reality (AR) system, a mixed reality (MR) system, or some combination thereof. In this example, the system 100 includes a HMD 105, an imaging device 110, and an input/output (I/O) interface 115, which are each coupled to a console 120. While FIG. 1 shows a single HMD 105, a single imaging device 110, and an I/O interface 115, in other embodiments, any number of these components may be included in the system. For example, there may be multiple HMDs 105 each having an associated input interface 115 and being monitored by one or more imaging devices 110, with each HMD 105, I/O interface 115, and imaging devices 110 communicating with the console 120. In alternative configurations, different and/or additional components may also be included in the system 100. The HMD 105 may act as a VR, AR, and/or a MR HMD. An MR and/or AR HMD augments views of a physical, real-world environment with computer-generated elements (e.g., images, video, sound, etc.).

The HMD 105 presents content to a user. Example content includes images, video, audio, or some combination thereof. Audio content may be presented via a separate device (e.g., speakers and/or headphones) external to the HMD 105 that receives audio information from the HMD 105, the console 120, or both. The HMD 105 includes an electronic display 155, an eye tracking module 160, an optics block 165, one or more locators 170, an internal measurement unit (IMU) 175, head tracking sensors 180, and a scene rendering module 185, and a vergence processing module 190.

The electronic display 155 includes an LCD device including a LCD panel and a backlight. The backlight includes LED assemblies with dichroic combiners and color LEDS. The dichroic combiner combines light from different colored LEDs, and provides the combined light to a light guide of the backlight for illuminating the LCD panel. As discussed in greater detail below, the dichroic combiner allows multiple LEDs to provide edge-lighting for the backlight, without requiring the LEDs to be arranged along an edge of the LD panel. The LEDs may be placed in other locations within a display device and/or HMD to improve parameters such as device size, shape, aesthetics, weight distribution, etc.

The optics block 165 adjusts its focal length responsive to instructions from the console 120. In some embodiments, the optics block 165 includes a multi multifocal block to adjust a focal length (adjusts optical power) of the optics block 165

The eye tracking module 160 tracks an eye position and eye movement of a user of the HMD 105. A camera or other optical sensor inside the HMD 105 captures image information of a user's eyes, and the eye tracking module 160 uses the captured information to determine interpupillary distance, interocular distance, a three-dimensional (3D) position of each eye relative to the HMD 105 (e.g., for distortion adjustment purposes), including a magnitude of torsion and rotation (i.e., roll, pitch, and yaw) and gaze directions for each eye. The information for the position and orientation of the user's eyes is used to determine the gaze point in a virtual scene presented by the HMD 105 where the user is looking.

The vergence processing module 190 determines a vergence depth of a user's gaze based on the gaze point or an estimated intersection of the gaze lines determined by the eye tracking module 160. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, the vergence processing module 190 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused.

The locators 170 are objects located in specific positions on the HMD 105 relative to one another and relative to a specific reference point on the HMD 105. A locator 170 may be a light emitting diode (LED), a corner cube reflector, a reflective marker, a type of light source that contrasts with an environment in which the HMD 805 operates, or some combination thereof. Active locators 170 (i.e., an LED or other type of light emitting device) may emit light in the visible band (~380 nm to 850 nm), in the infrared (IR) band (~850 nm to 1 mm), in the ultraviolet band (10 nm to 380 nm), some other portion of the electromagnetic spectrum, or some combination thereof.

The locators 170 can be located beneath an outer surface of the HMD 105, which is transparent to the wavelengths of light emitted or reflected by the locators 170 or is thin enough not to substantially attenuate the wavelengths of light emitted or reflected by the locators 170. Further, the outer surface or other portions of the HMD 105 can be opaque in the visible band of wavelengths of light. Thus, the locators 170 may emit light in the IR band while under an outer surface of the HMD 105 that is transparent in the IR band but opaque in the visible band.

The IMU 175 is an electronic device that generates fast calibration data based on measurement signals received from one or more of the head tracking sensors 180, which generate one or more measurement signals in response to motion of HMD 105. Examples of the head tracking sensors 180 include accelerometers, gyroscopes, magnetometers, other sensors suitable for detecting motion, correcting error associated with the IMU 175, or some combination thereof. The head tracking sensors 180 may be located external to the IMU 175, internal to the IMU 175, or some combination thereof.

Based on the measurement signals from the head tracking sensors 180, the IMU 175 generates fast calibration data indicating an estimated position of the HMD 105 relative to an initial position of the HMD 105. For example, the head tracking sensors 180 include multiple accelerometers to measure translational motion (forward/back, up/down, left/right) and multiple gyroscopes to measure rotational motion (e.g., pitch, yaw, and roll). The IMU 175 can, for example, rapidly sample the measurement signals and calculate the estimated position of the HMD 105 from the sampled data. For example, the IMU 175 integrates measurement signals received from the accelerometers over time to estimate a velocity vector and integrates the velocity vector over time to determine an estimated position of a reference point on the HMD 105. The reference point is a point that may be used to describe the position of the HMD 105. While the reference point may generally be defined as a point in space, in various embodiments, a reference point is defined as a point within the HMD 105 (e.g., a center of the IMU 175). Alternatively, the IMU 175 provides the sampled measurement signals to the console 120, which determines the fast calibration data.

The IMU 175 can additionally receive one or more calibration parameters from the console 120. As further discussed below, the one or more calibration parameters are used to maintain tracking of the HMD 105. Based on a received calibration parameter, the IMU 175 may adjust one or more of the IMU parameters (e.g., sample rate). In some embodiments, certain calibration parameters cause the IMU 215 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The scene rendering module 185 receives content for the virtual scene from a VR engine 145 and provides the content for display on the electronic display 155. Additionally, the scene rendering module 185 can adjust the content based on information from the IMU 175, the vergence processing module 830, and the head tracking sensors 180. The scene rendering module 185 determines a portion of the content to be displayed on the electronic display 155 based on one or more of the tracking module 140, the head tracking sensors 180, or the IMU 175.

The imaging device 110 generates slow calibration data in accordance with calibration parameters received from the console 120. Slow calibration data includes one or more images showing observed positions of the locators 125 that are detectable by imaging device 110. The imaging device 110 may include one or more cameras, one or more video cameras, other devices capable of capturing images including one or more locators 170, or some combination thereof. Additionally, the imaging device 110 may include one or more filters (e.g., for increasing signal to noise ratio). The imaging device 110 is configured to detect light emitted or reflected from the locators 170 in a field of view of the imaging device 110. In embodiments where the locators 170 include passive elements (e.g., a retroreflector), the imaging device 110 may include a light source that illuminates some or all of the locators 170, which retro-reflect the light towards the light source in the imaging device 110. Slow calibration data is communicated from the imaging device 110 to the console 120, and the imaging device 110 receives one or more calibration parameters from the console 120 to adjust one or more imaging parameters (e.g., focal length, focus, frame rate, ISO, sensor temperature, shutter speed, aperture, etc.).

The I/O interface 115 is a device that allows a user to send action requests to the console 120. An action request is a request to perform a particular action. For example, an action request may be to start or end an application or to perform a particular action within the application. The I/O interface 115 may include one or more input devices. Example input devices include a keyboard, a mouse, a hand-held controller, a glove controller, or any other suitable device for receiving action requests and communicating the received action requests to the console 120. An action request received by the I/O interface 115 is communicated to the console 120, which performs an action corresponding to the action request. In some embodiments, the I/O interface 115 may provide haptic feedback to the user in accordance with instructions received from the console 120. For example, haptic feedback is provided by the I/O interface 115 when an action request is received, or the console 120 communicates instructions to the I/O interface 115 causing the I/O interface 115 to generate haptic feedback when the console 120 performs an action.

The console 120 provides content to the HMD 105 for presentation to the user in accordance with information received from the imaging device 110, the HMD 105, or the I/O interface 115. The console 120 includes an application store 150, a tracking module 140, and the VR engine 145. Some embodiments of the console 120 have different or additional modules than those described in conjunction with FIG. 1. Similarly, the functions further described below may be distributed among components of the console 120 in a different manner than is described here.

The application store 150 stores one or more applications for execution by the console 120. An application is a group of instructions, that when executed by a processor, generates content for presentation to the user. Content generated by an application may be in response to inputs received from the user via movement of the HMD 105 or the I/O interface 115. Examples of applications include gaming applications, conferencing applications, video playback application, or other suitable applications.

The tracking module 140 calibrates the system 100 using one or more calibration parameters and may adjust one or more calibration parameters to reduce error in determining position of the HMD 105. For example, the tracking module 140 adjusts the focus of the imaging device 110 to obtain a more accurate position for observed locators 170 on the HMD 105. Moreover, calibration performed by the tracking module 140 also accounts for information received from the IMU 175. Additionally, if tracking of the HMD 105 is lost (e.g., imaging device 110 loses line of sight of at least a threshold number of locators 170), the tracking module 140 re-calibrates some or all of the system 100 components.

Additionally, the tracking module 140 tracks the movement of the HMD 105 using slow calibration information from the imaging device 110 and determines positions of a reference point on the HMD 105 using observed locators from the slow calibration information and a model of the HMD 105. The tracking module 140 also determines positions of the reference point on the HMD 105 using position information from the fast calibration information from the IMU 175 on the HMD 105. Additionally, the tracking module 160 may use portions of the fast calibration information, the slow calibration information, or some combination thereof, to predict a future location of the HMD 105, which is provided to the VR engine 145.

The VR engine 145 executes applications within the system 100 and receives position information, acceleration information, velocity information, predicted future positions, or some combination thereof for the HMD 105 from the tracking module 140. Based on the received information, the VR engine 145 determines content to provide to the HMD 105 for presentation to the user, such as a virtual scene, one or more virtual objects to overlay onto a real world scene, etc.

In some embodiments, the VR engine 145 maintains focal capability information of the optics block 165. Focal capability information is information that describes what focal distances are available to the optics block 165. Focal capability information may include, e.g., a range of focus the optics block 165 is able to accommodate (e.g., 0 to 4 diopters), a resolution of focus (e.g., 0.25 diopters), a number of focal planes, combinations of settings for switchable half wave plates (SHWPs) (e.g., active or non-active) that map to particular focal planes, combinations of settings for SHWPS and active liquid crystal lenses that map to particular focal planes, or some combination thereof.

The VR engine 145 generates instructions for the optics block 165, the instructions causing the optics block 165 to adjust its focal distance to a particular location. The VR engine 145 generates the instructions based on focal capability information and, e.g. information from the vergence processing module 190, the IMU 175, and the head tracking sensors 180. The VR engine 145 uses the information from the vergence processing module 190, the IMU 175, and the head tracking sensors 180, or some combination thereof, to select an ideal focal plane to present content to the user. The VR engine 145 then uses the focal capability information to select a focal plane that is closest to the ideal focal plane. The VR engine 145 uses the focal information to determine settings for one or more SHWPs, one or more active liquid crystal lenses, or some combination thereof, within the optics block 165 that are associated with the selected focal plane. The VR engine 145 generates instructions based on the determined settings, and provides the instructions to the optics block 165.

The VR engine 145 performs an action within an application executing on the console 120 in response to an action request received from the I/O interface 115 and provides feedback to the user that the action was performed. The provided feedback may be visual or audible feedback via the HMD 105 or haptic feedback via the I/O interface 115.

Figure 2:
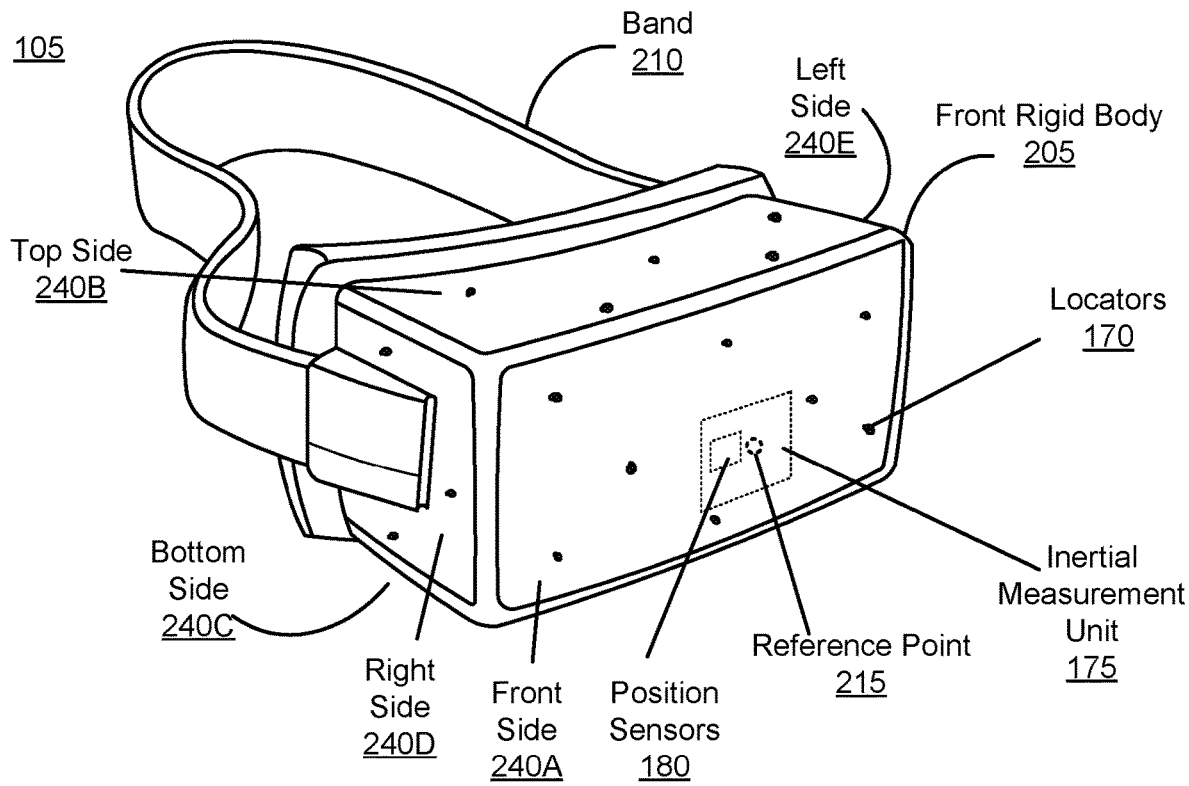
FIG. 2 shows a head-mounted display (HMD), in accordance with some embodiments.

FIG. 2 shows a head-mounted display (HMD) 105, in accordance with some embodiments. The HMD 105 includes a front rigid body 205 and a band 210. The front rigid body 205 includes an electronic display (not shown), an inertial measurement unit (IMU) 175, one or more position sensors 180, and locators 170. In some embodiments, a user movement is detected by use of the inertial measurement unit 175, position sensors 180, and/or the locators 170, and an image is presented to a user through the electronic display according to the user movement detected. In some embodiments, the HMD 105 can be used for presenting a virtual reality, an augmented reality, or a mixed reality to a user.

A position sensor 180 generates one or more measurement signals in response to motion of the HMD 105. Examples of position sensors 180 include: one or more accelerometers, one or more gyroscopes, one or more magnetometers, another suitable type of sensor that detects motion, a type of sensor used for error correction of the IMU 175, or some combination thereof. The position sensors 180 may be located external to the IMU 175, internal to the IMU 175, or some combination thereof. In FIG. 2, the position sensors 180 are located within the IMU 175, and neither the IMU 175 nor the position sensors 180 are visible to the user.

Based on the one or more measurement signals from one or more position sensors 180, the IMU 175 generates calibration data indicating an estimated position of the HMD 105 relative to an initial position of the HMD 105. In some embodiments, the IMU 175 rapidly samples the measurement signals and calculates the estimated position of the HMD 100 from the sampled data. For example, the IMU 175 integrates the measurement signals received from the accelerometers over time to estimate a velocity vector and integrates the velocity vector over time to determine an estimated position of a reference point on the HMD 105. Alternatively, the IMU 175 provides the sampled measurement signals to a console (e.g., a computer), which determines the calibration data. The reference point is a point that may be used to describe the position of the HMD 105. While the reference point may generally be defined as a point in space; however, in practice the reference point is defined as a point within the HMD 105 (e.g., a center of the IMU 175).

The locators 180 are located in fixed positions on the front rigid body 205 relative to one another and relative to a reference point 215. In FIG. 2, the reference point 215 is located at the center of the IMU 175. Each of the locators 170 emits light that is detectable by an imaging device (e.g., camera or an image sensor). Locators 170, or portions of locators 170, are located on a front side 240A, a top side 240B, a bottom side 240C, a right side 240D, and a left side 240E of the front rigid body 205 in the example of FIG. 2.

Figure 3:
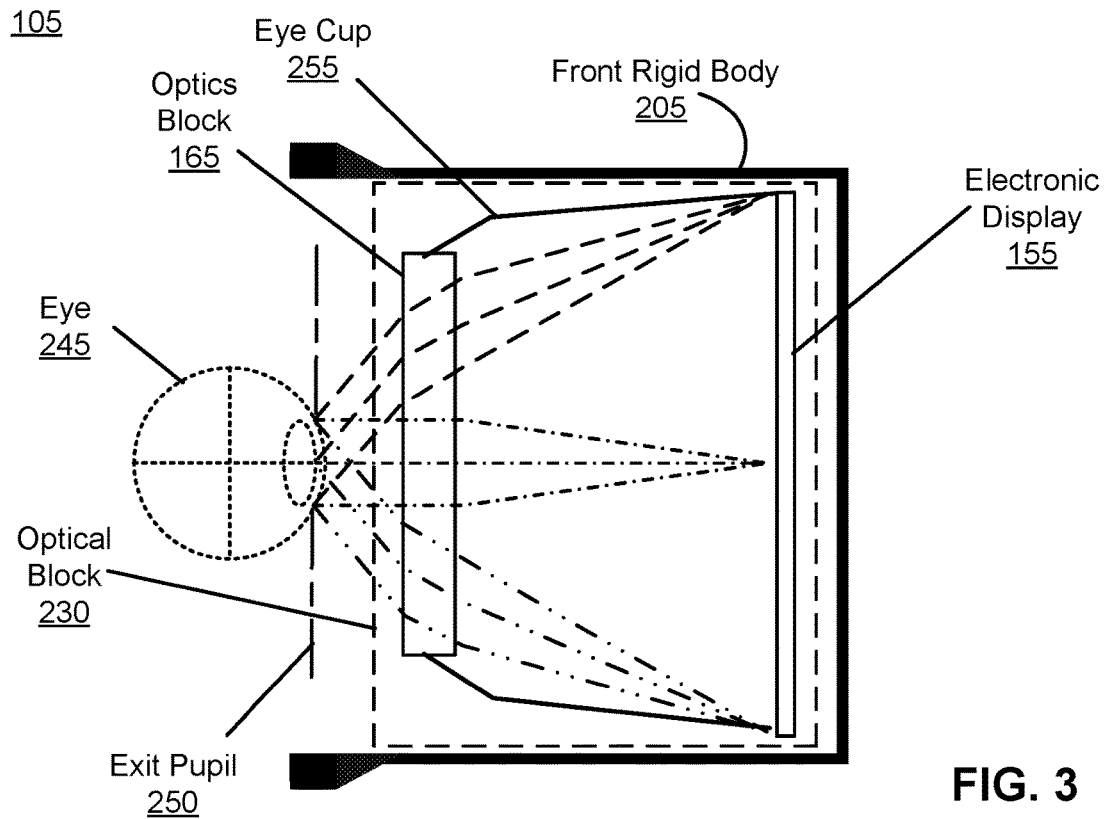
FIG. 3 shows a cross section of a front rigid body of the HMD in FIG. 2, in accordance with some embodiments.

FIG. 3 shows a cross section of the front rigid body 205 of the HMD 105 shown in FIG. 2. The front rigid body 205 includes an optical block 230 that provides altered image light to an exit pupil 250. The exit pupil 250 is the location in the front rigid body 205 where a user's eye 245 is positioned. For purposes of illustration, FIG. 3 shows a cross section associated with a single eye 245, but the HMD 105 may include another optical block that provides altered image light to another eye of the user.

The optical block 230 includes the electronic display 155, the optics block 165, and an eye cup 255. The eye cup 255 is mechanically secured with the front rigid body 205, and holds the optics block 165. The electronic display 155 emits image light toward the optics block 165. The optics block 165 magnifies the image light, and in some embodiments, also corrects for one or more additional optical errors (e.g., distortion, astigmatism, etc.). The optics block 165 directs the image light to the exit pupil 250 for presentation to the user. In some embodiments, the optics block 165 and the eye cone 255 may be omitted from the optical block 230.

Figure 4:
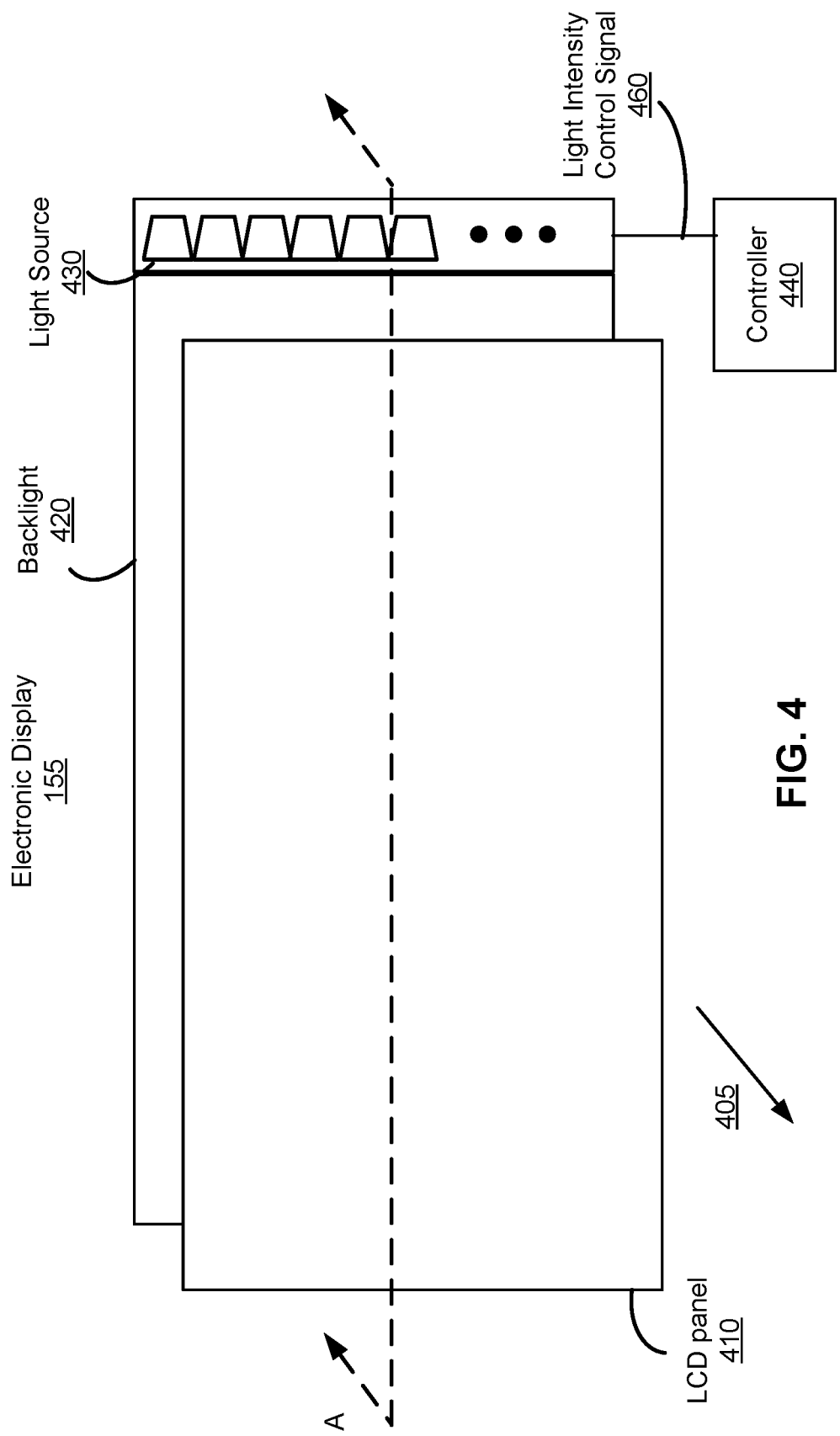
FIG. 4 shows an exploded front view of an electronic display, in accordance with some embodiments.

FIG. 4 shows an exploded front view of an example of an electronic display 155. Although the HMD 105 may include various types of displays, the electronic display 155 in this embodiment is a LCD device including a liquid crystal display (LCD) panel 410, a backlight 420, and a controller 440. The backlight 420 emits light towards the exit pupil 250 through the LCD panel 410 in a direction 405. The LCD panel 410 is disposed between the backlight 420 and the exit pupil 250, and controls an amount of light from the backlight 420 to pass through in the direction 405 on a per pixel basis. A space between the LCD panel 410 and the backlight 420 may be vacuum or filled with transparent material. In other embodiments, the electronic display 155 includes different, or fewer components than shown in FIG. 4.

The backlight 420 includes light sources 430 that generate light. The light sources 430 include LEDs of different color or spectrum intensities (e.g., R, G, and B) that can be separately controlled and optimized to desired spectrum intensities and emission response times. The spectrum intensity of each LED of the light sources 430 may be chosen to collectively produce combined light having wider color gamut and/or brightness than white light from white LEDs. In some embodiments, the light sources 430 may be packaged as LED assemblies that include dichroic combiners and different color LEDs optically coupled with the dichroic combiners.

The intensity (e.g. over time) of light from a light source 430 is adjusted according to a light intensity control signal 460 from the controller 440. In some embodiments, the backlight 420 may be a strobed backlight where LEDs are switched on and off over time (e.g., according to a duty cycle). The light intensity control signal is a signal indicative of intensity of light to be output for each light source 430. Different colored light sources 430 can output corresponding light with different intensity, according to the light intensity control signal. For example, a red light source outputs red light with an intensity corresponding to '10' out of '255', a green light source outputs green light with an intensity corresponding to '30' out of '255', and a blue light source outputs blue light with an intensity corresponding to '180' out of '255,' according to the light intensity control signal. A light source may adjust its duty cycle of or an amount of current supplied to LEDs according to light intensity control signals. For example, reducing current supplied to the LED or reducing 'ON' duration of the duty cycle renders intensity of light from a light source to be reduced (i.e., light to be dimmed).

In some embodiments, the controller 440 is configured to optimize an emission spectrum of the combined light from the light sources 430 based on separately controlling the emission spectrums of differently colored LEDs 430. The emission spectrum of a first color LED may be controlled relative to the emission spectrum of a second color LED. In some embodiments, the controller 440 is configured to optimize input signals to the differently colored LEDs to balance the emission response times of the differently colored LEDs. The emission response of a first color LED may be controlled relative to the emission response time of a second color LED. The optical elements (not shown in FIG. 4 but shown in FIG. 5) of the backlight 420 receive light from the light sources 430, and create combined light having a color corresponding to a combination of colors of the received light.

Figure 5:
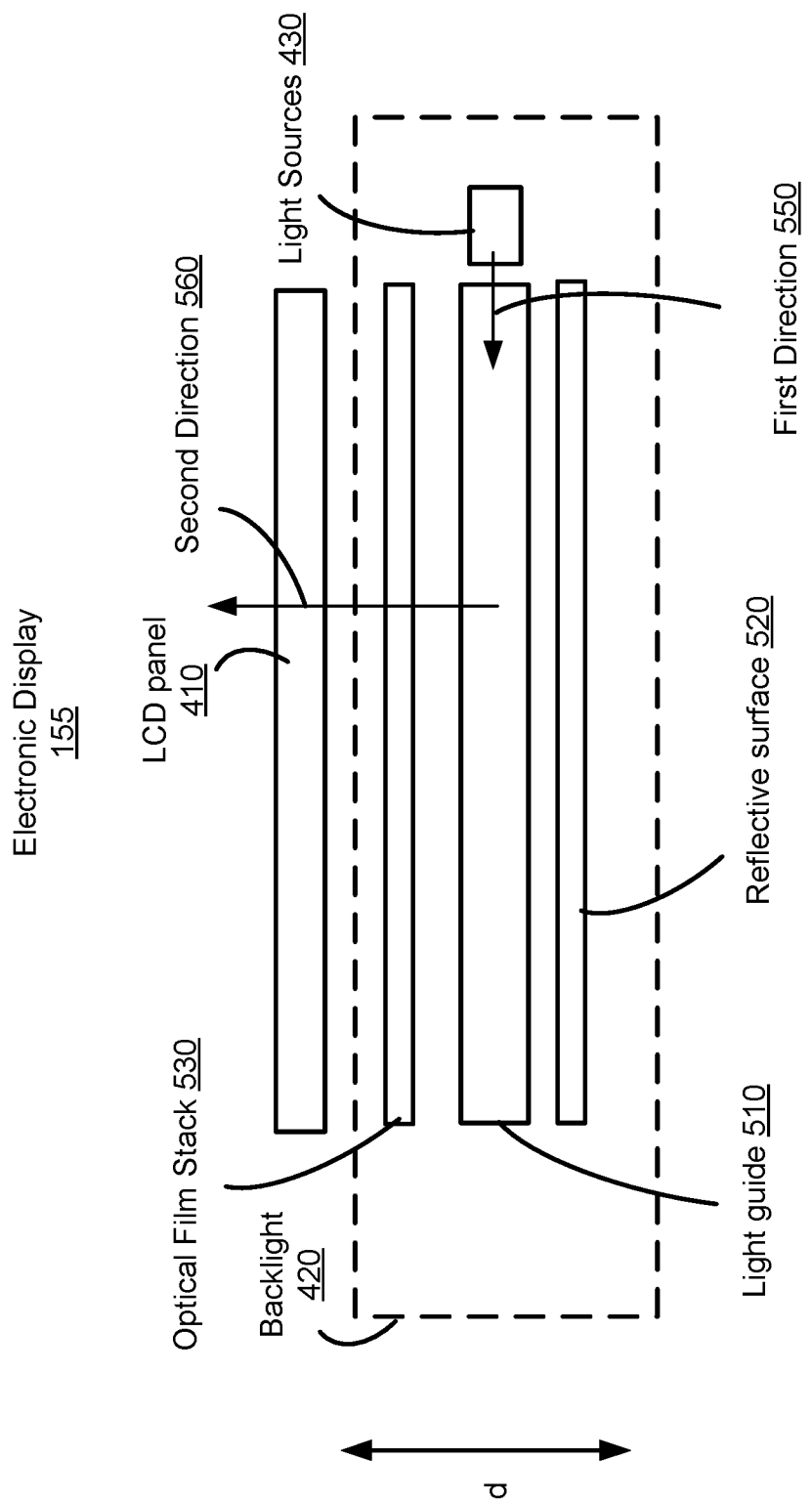
FIG. 5 shows a cross sectional side view of the electronic display, in accordance with some embodiments.

FIG. 5 shows a cross sectional side view of the electronic display 155, in accordance with some embodiments. The cross sectional side view is taken along line A for the electronic display 155 as shown in FIG. 4. The backlight 420 is disposed behind the LCD panel along a depth dimension d. The backlight 420 includes light sources 430, a light guide 510, a reflective surface 520, and an optical film stack 530. The light guide 510 may be composed of a glass material or a transparent plastic material, and refractive and/or reflective components for receiving light from the light sources 430 in a first direction 550 and projecting light towards the LCD panel 410 in a second direction 560. For example, the light guide 510 may include a structure having a series of unevenly spaced bumps that diffuse propagating light. The density of the bumps increase with distance to the light sources 430 according to a diffusion equation. The light guide 510 receives light with different colors from the light sources 430, and directs combined light including a combination of the different colors in a different direction toward the LCD panel 410 to illuminate the LCD panel 410. The combined light includes improved spectrum intensity across different wavelengths, as described in detail below with respect to FIGS. 6A and 6B.

The light sources 430 include a plurality of LEDs that emit light toward one or more edges of the LCD panel 410 to provide edge-lighting for the backlight 420. In some embodiments, the light sources 430 may be part of an LED assembly including a dichroic combiner, as discussed in greater detail below.

The optical film stack 530 may be disposed between the light guide 510 and the LCD panel 410. The optical film stack 530 may include a diffuser that facilitates the uniform distribution of light from the light guide 510 across the pixels of the LCD panel 410. The optical film stack 530 may additionally or alternatively include a reflective polarizer film that reflects unpolarized light back toward the LCD panel 410 that would otherwise be absorbed. The optical film stack 530 may also include brightness enhancement films (BEFs) that control the intensity as a function of angle and recycle light through the system.

The light guide 510 directs light towards its top and bottom surfaces, where the top surface faces the LCD panel 410 and the bottom surface faces the reflective surface 520. The reflective surface 520 includes an optical mirror that reflects light directed from the bottom surface of the light guide 510 towards the LCD panel 410.

Returning to FIG. 4, the LCD panel 410 receives a liquid crystal control signal from the controller 440, and passes light from the backlight 420 towards the exit pupil in the direction 405, according to the liquid crystal control signal. The liquid crystal control signal is a signal indicative of an amount of light to be passed through a liquid crystal layer of the LCD panel 410 for different pixels. The LCD panel 410 includes a plurality of liquid crystals, and an orientation of the liquid crystals can be changed according to the light crystal control signal applied across electrodes of the liquid crystal layer.

The controller 440 is a circuitry that receives an input image data, and generates control signals for driving the LCD panel 410 and the LED light sources 430. The input image data may correspond to an image or a frame of a video in a virtual reality and/or augmented reality application. The controller 440 generates the light intensity control signal 460 for controlling intensity of light output by the light sources 430. In addition, the controller 440 generates the liquid crystal control signal 460 to determine an amount of light passing from the backlight 420 towards the exit pupil 250 through the LCD panel 410 according to the input image data. The controller 440 provides the light intensity control signal 460 to the light sources 430, and the liquid crystal control signal to the liquid crystal layer 410 at a proper timing to display images.

Figure 6A:
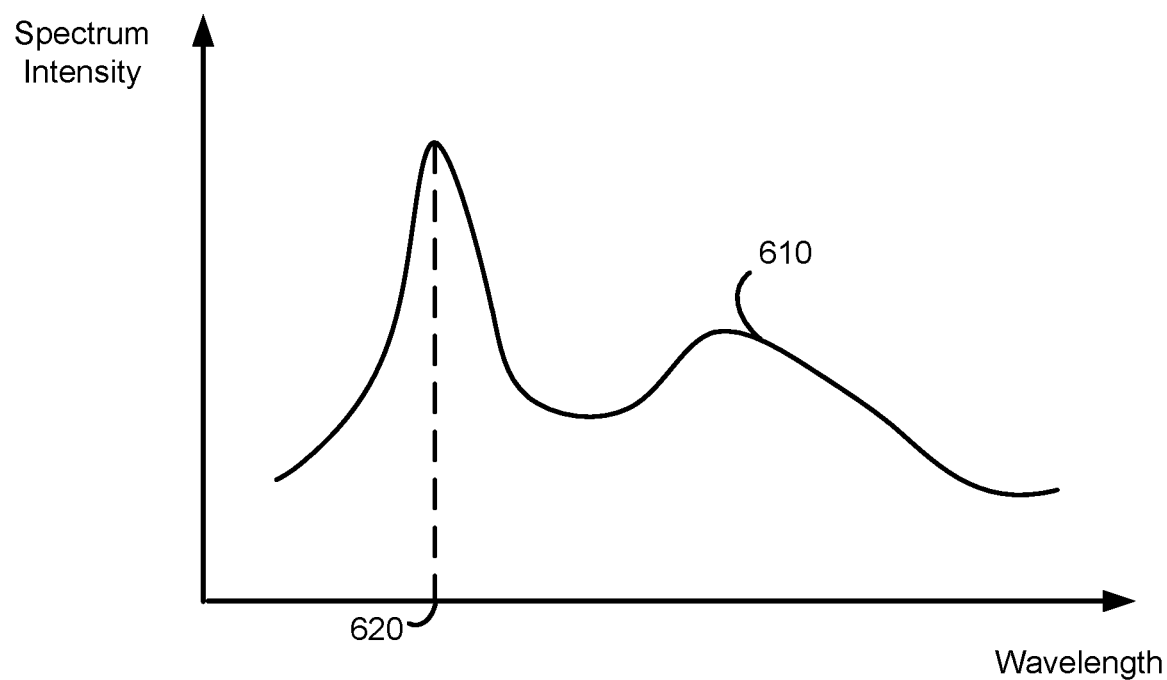
FIG. 6A shows a spectrum intensity of white light generated by a single white LED, in accordance with some embodiments.

FIG. 6A shows an exemplary spectrum intensity of white light generated by a single white LED. A spectrum intensity plot 610 represents spectrum intensity across different wavelengths (or frequency). The white light generated by the white LED single light source has varying light intensity across different wavelengths. For example, the spectrum intensity plot 610 has a peak at a wavelength 620, and has lower spectrum intensity at other wavelengths. A white LED may include a blue LED with a yellow phosphor coating, with the peak 620 corresponding with blue wavelengths. Accordingly, some color components corresponding to the other wavelengths may have reduced intensity than a color component corresponding to the wavelength 620. Put another way, the color gamut of the white LED is sub-optimal, which can result in color distortion when light from the white LED is passed through the LCD panel 410.

Figure 6B:
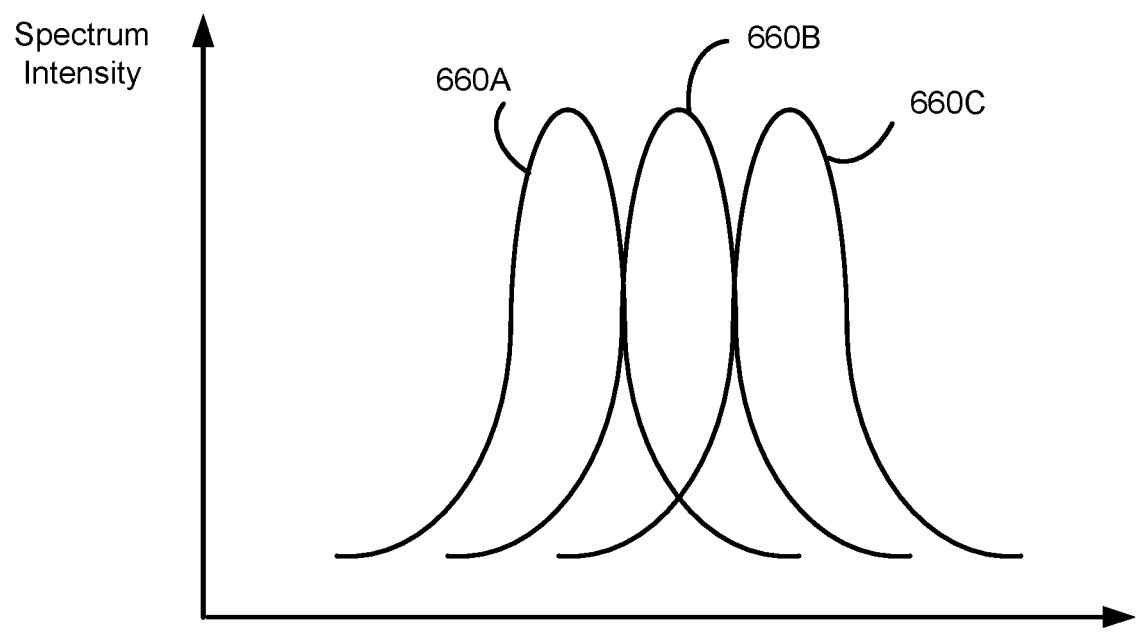
FIG. 6B shows spectrum intensity of white light generated by a combination of separate red, green, and blue LEDs, in accordance with some embodiments.

FIG. 6B shows spectrum intensity of white light generated by separate red, green, and blue LEDs, in accordance with some embodiments. The spectrum plot 660A represents spectrum intensity of blue light output by a blue light source, a spectrum plot 660B represents spectrum intensity of green light output by a green light source, and a spectrum plot 660C represents spectrum intensity of red light output by a red light source. As shown by the spectrum plots 660A, 660B, and 660C, the differently colored light sources emit light with similar intensity at corresponding wavelengths, either by their physical design or via control of input signals (e.g., larger driving current for lower efficiency LEDs to achieve uniform intensity levels, or other desired intensity levels). Light from the different light sources results in a combined light. Thus, improved colors, for example, in red, green, blue, cyan, magenta, yellow and black, can be displayed. As a result, the color gamut or color purity displayed on the electronic display device can be improved.

LED Assemblies with Dichroic Combiner for Backlight

Figure 7:
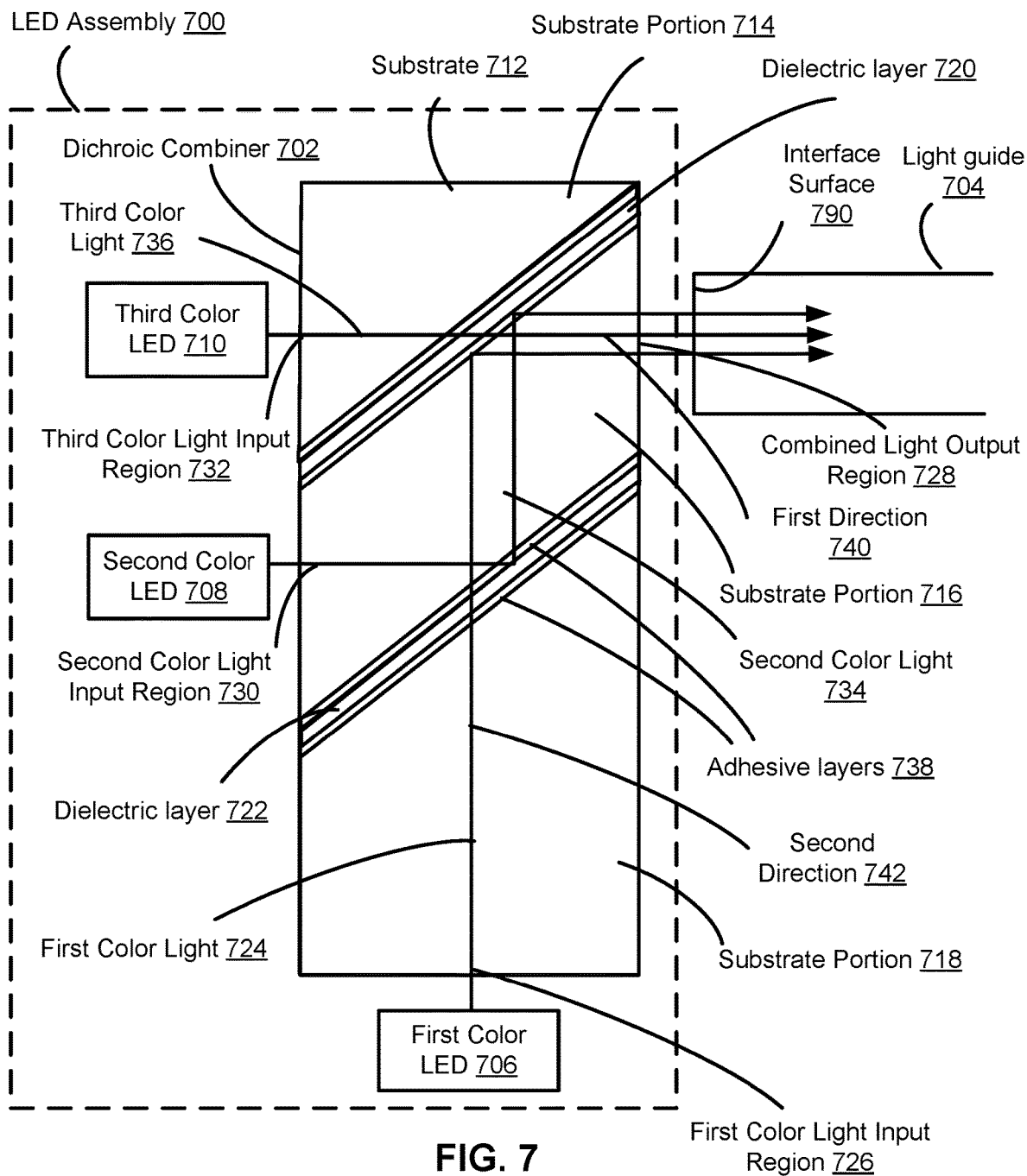
FIG. 7 shows an LED assembly including a dichroic combiner, in accordance with some embodiments.

FIG. 7 shows an LED assembly 700 including a dichroic combiner 702. The LED assembly 700 is an illumination source for an edge-lit backlight. A dichroic combiner combines light from two or more color LEDs, and outputs the combined light with thin coupling to a light guide of a backlight. For example, the dichroic combiner 702 combines light from first color LED 706, a second color LED 708, and a third color LED 710, homogenizes and superimposes the light, and outputs the light at combined light output region 728 to a light guide 704.

In some embodiments, the first color LED 706 is a red LED, the second color LED 708 is a green LED, and the third color LED 710 is a blue LED. In other embodiments, different color LEDs may be with a dichroic combiner other than red, green, and blue LEDs. In some embodiments, the selection of color LEDs is chosen such that the color light from the color LEDs can be combined into a white light. The dichroic combiner 702 is optically coupled with the color LEDs, and may also be mechanically coupled with the color LEDs to facilitate the optical coupling.

The combined light output regions 728 of multiple LED assemblies 700 may be disposed behind the LCD panel along one or more edges of an LCD panel to provide the illumination source of the backlight. As shown in FIG. 7, dichroic combiner 702 is positioned such that the combined light output region 728 directs light in a first direction 740 from the LEDs 706, 708, 710 to the interface surface 790 of the light guide 704. The color LEDS are mechanically coupled with the dichroic combiner at locations away from the combined light output region 728, and thus placed away from the one or more edges of the LCD panel.

The dichroic combiner 702 includes a substrate 712 to propagate light from the color LEDs. For example, the first color, second color, and third color LEDs 706, 708, 710 are mechanically and optically coupled with the substrate 712 at first color light input region 726, a second color input region 730, and a third color input region 732. The dichroic combiner 702 allows color LEDs to optically couple at spatially separated input regions and at different propagation directions, and selectively redirects the color light in a direction toward the light guide 704 at the combined light output region 728. Therefore, more color LEDs can be optically coupled at the interface surface 790 of the light guide 704 than would be otherwise possible, improving the brightness of the backlight 420. In some embodiments, the dichroic combiner 702 includes a homogenization region at the combined light output region 728. The homogenization region is an extrusion of the dichroic combiner 702, such as an extrusion having a rectangular, hexagonal, or other shape. The color LEDs may be mechanically attached with the dichroic combiner 702 through an assembly or bonding process. In some embodiments, an optically clear adhesive is applied on the front of the LED package to attach the LED with die dichroic combiner 702.

The first color LED 706, second color LED 708, and third color LED 710 emit color light in directions directly into the dichroic combiner 702 in the embodiment shown in FIG. 7. In some embodiments, a color LEDs emits light at an angle (e.g., right angle) relative to the dichroic combiner 702 rather than directly into the dichroic combiner 702. The LED assembly 700 further includes a total internal reflection (TIR) or mirrored surface to direct the light from the color LED into the dichroic combiner. For example, the first color LED 706 may be oriented to emit light at an angle relative to the second direction 742, with the mirrored surface reflecting the light into the dichroic combiner 702 in the second direction 742. The substrate 712 includes substrate portions 714, 716, and 718, which are separated by dielectric layers 720 and 722. The dielectric layers 720 and 722 selectively reflect and transmit color light from the color LEDs to combine and superimpose the color light at the combined output region 728 of the substrate 712.

For example, the dielectric layer 722 is configured to transmit first color (e.g., red) light and reflect second color light (e.g., green). The dielectric layer 720 is configured to transmit third color light (e.g., blue) and reflect the first color light (e.g., red) and the second color light (e.g., green). The first color light 724 is received by the substrate 712 at the first color light input region 726, and propagated to the first dielectric layer 722 via the substrate portion 718 in a second direction 742. The first dielectric layer 722 transmits the first color light 724 to the second dielectric layer 720 via the substrate portion 716 in the second direction 742. The second dielectric layer 720 receives the first color light 724 via the substrate portion 716 and reflects the first color light 724 to the combined light output region 728 in the first direction 740.

Second color light 734 is received by the substrate 712 at the second color input region 730 in the first direction 740, and propagated to the first dielectric layer 722 via substrate portion 716. The first dielectric layer 722 reflects the second color light 734 to the second dielectric layer 720 via the substrate portion 716 in the second direction 742. The second dielectric layer 720 receives the second color light 734 via the substrate portion 716 in the second direction 742, and reflects the second color light 734 to the combined light output region 728 in the first direction 740.

Third color light 736 is received by the substrate 712 at the third color light input region 732 in the first direction 740, and propagated to the second dielectric layer 720 via substrate portion 714. The second dielectric layer 720 transmits the third color light to the substrate portions 716 in the first direction 740, and then to the combined light output region 728. The dichroic combiner 702 spatially superimposes the first, second, and third color light at the combined light output region 728.

The dielectric layers 720 and 722 reflect light in particular directions based on being slanted at an angle. For examples, the dielectric layers 720 and 722 may be slanted at 45 degrees with respect to the first direction 740 and the second direction 742 to reflect light traveling in the first direction 740 to travel in the second direction 742, or vice versa. In another example discussed in greater detail below, the dielectric layers 720 and 722 may be slanted at different angles to facilitate light propagation through a bent substrate of the dichroic combiner.

Figure 8:
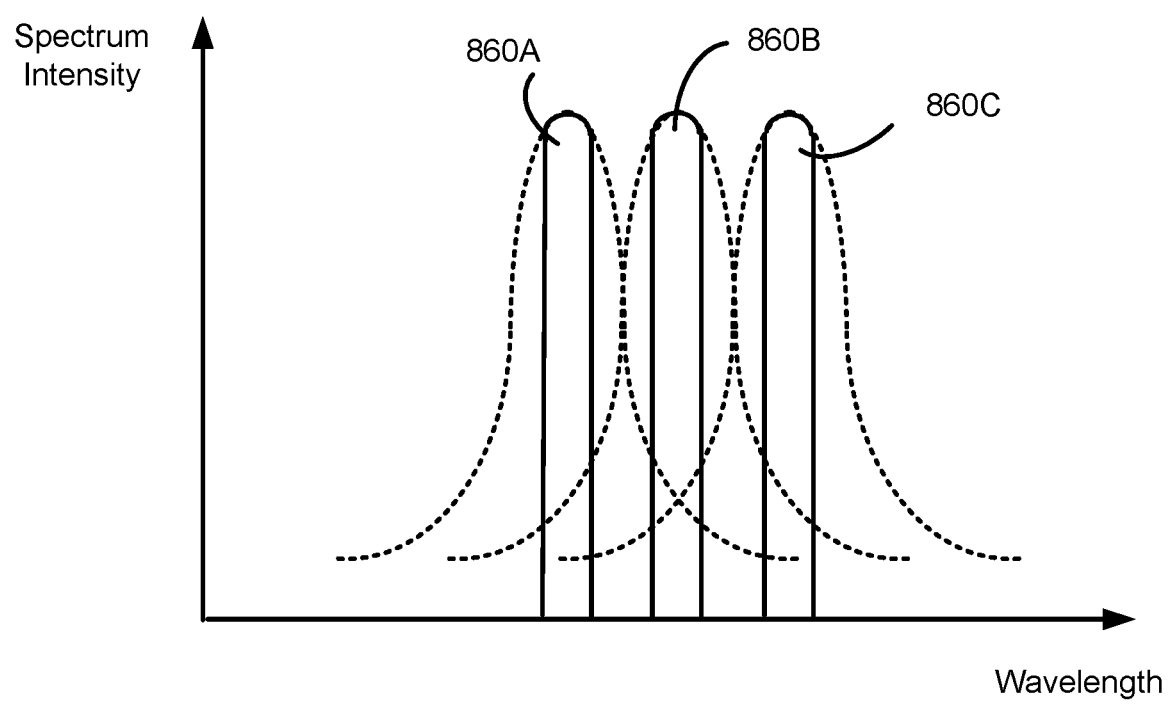
FIG. 8 shows spectrum intensities of red, green, and blue LEDs subsequent to spectral filtering by a dichroic combiner.

In some embodiments, the dielectric layers 720 and 722 act as spectral filters that selectively transmit or reflect colored light as a function of wavelength. Spectral filtering can further improve color gamut or color purity. FIG. 8 shows spectrum intensities of red, green, and blue LEDs subsequent to spectral filtering by a dichroic combiner. Spectrum plot 860A represents spectrum intensity of blue light subsequent to spectral filtering, spectrum plot 860B represents spectrum intensity of subsequent to spectral filtering, and spectrum plot 860C represents spectrum intensity of red light subsequent to spectral filtering. The unfiltered outputs from the blue, green, and red LEDs are shown in outline. As such, one or more dielectric layers may be configured to narrow emission spectrum bandwidth of color light emitted from color LEDs. In some embodiments, the dichroic filters provide additional filtering as a function of angle to match any necessary properties of the optical film stack 530 and LCD panel 410 to provide uniform color performance across viewing angle. In some embodiments, the substrate 712 may include a flexible (e.g., polymer) material such that the dichroic combiner 702 is capable of being bent. The substrate material is further configured to homogenize colored light as the colored light propagates through the substrate. The substrate 712 may alternatively use a rigid material molded to the desired (e.g., bent) shape. Some example substrate materials may include poly(methyl methacrylate) (PMMA), polycarbonate (PC). Cyclo Olefin Polymers (COP), Cyclo Olefin Co-Polymers (COC), or other transparent polymers.

In some embodiments, the dichroic combiner 702 may include adhesive layers 738 that bond the substrate portions 714-718 with the dielectric layers 720 and 722. The adhesive layers 738 may include an index of refraction that matches the index of refraction of the substrate to be optically benign with respect to the color light. In some embodiments, the adhesive layers 738 include an optically clear adhesive, and the first and second dielectric layers 720 and 722 include a dielectric coating.

FIG. 9 shows a cross sectional side view of an electronic display 900, in accordance with some embodiments. The electronic display 900 includes a backlight 902 including LED assemblies 700 that serve as light sources for the backlight 902. The backlight 902 further includes a light guide 950, a reflective surface 960, and an optical film stack 940. The electronic display 900 further includes an LCD panel 920, and the backlight 902 is disposed behind the LCD panel 920 along a depth dimension d.

The combined light output region 728 of the dichroic combiner 702 is aligned with the interface surface 790 of the light guide 950. The light beam for a LED assembly 700 projects a relatively small area on interface surface 790 of the light guide 750 because of the spatially superimposed color light at the combined light output region 728. Therefore, the dichroic combiner 702 allows multiple (e.g., two or more) LEDs to be optically coupled with the light guide 950 without requiring an increase to the thickness or size of the light guide 950 at the interface surface 790.

FIG. 10 shows a front view of the backlight 902 of the electronic display 900 taken along the line C shown in FIG. 9. Multiple LED assemblies 700 are arranged adjacently along an edge of the light guide 950. In FIG. 10, the LED assemblies 700 are arranged along the left edge of the light guide 950. In various embodiments, LED assemblies 700 may be arranged along one or more edges of the light guide 950, such as the left, right, top, and/or bottom edges.

In FIG. 10, multiple sets of red, green, and blue color LEDs share a dichroic combiner 702. In some embodiments, separate dichroic combiners 702 may be used, such as for each set of red, green, and blue color LEDs. In some embodiments, the color LEDs are connected to a controller via one or more LED boards, such as LED board 970 shown in FIG. 10 In one example, the red, green, and blue color LEDs are respectively coupled with a red, green, and blue LED board. In another example, a single LED board may provide for electrical connections to different color LEDs, such as each of the red, green, and blue LEDs. The LED board 970 may be a printed circuit board (PCB) and serves a substrate for electrical connection of the LEDs. The LED board 970 may be connected with the controller to provide light intensity control signals from the controller to the LEDs. In some embodiments, the LED board 970 may include a flexible PCB.

Figure 11:
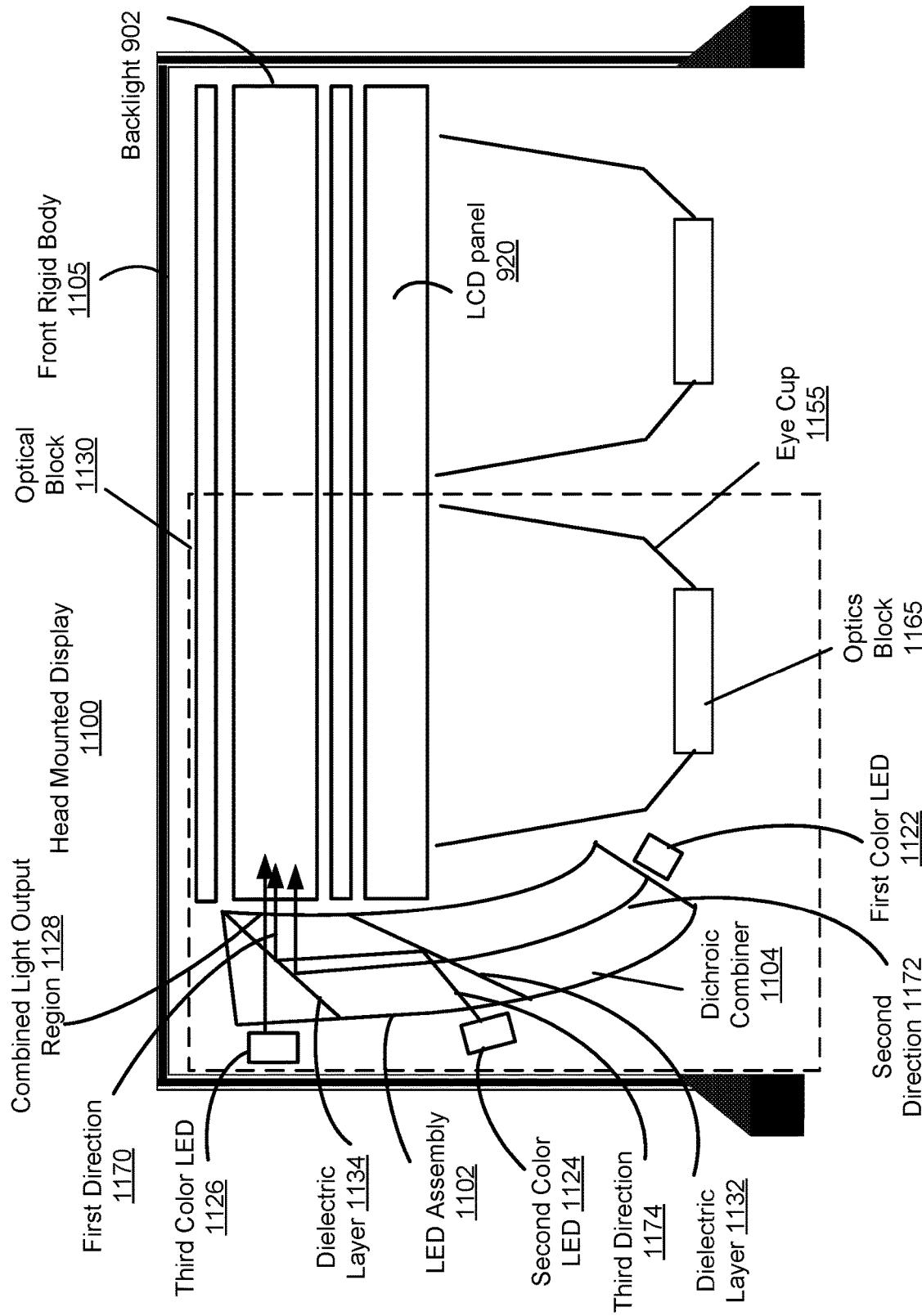
FIG. 11 shows a HMD including a dichroic combiner, in accordance with some embodiments.

FIG. 11 shows a HMD 1100 including a dichroic combiner, in accordance with some embodiments. The HMD 1100 includes front rigid body 1105 including an optical block 1130. The optical block 1130 includes LCD panel 920, a backlight 902 including LED assembly 1102, an eye cup 1155, and an optics block 1165. The LED assembly 1102 includes dichroic combiner 1104 and LEDs as discussed above. The backlight 902 is disposed behind the LCD panel 920, and the eye cup 1155 is disposed in front of the LCD panel 920.

As shown in FIG. 11, the LED assembly 1102 is bent toward the eye cup 1155 that holds the optics block 1165. The substrate of the dichroic combiner 1104 is flexible to support the bending toward or along an exterior of the eye cup 1155, or the substrate is a rigid material molded into the bent shape, and positioned with the bend toward the eye cup 1155. Advantageously, the weight of the HMD 1100 outside of the eye cup 1155 is reduced, and the dimensions of the HMD can also be reduced.

The dielectric layers 1132 and 1134 reflect light from the first, second, and third color LEDs 1122-1126 to the combined light output region 1128 in a first direction 1170 based on being slanted at an angle with respect to the first direction 1170. Here, the dielectric layers 1132 and 1134 are slanted at different angles with respect to the first direction 1170. For example, first color light is received by the substrate from the first color LED 1122 in a second direction 1172, and propagated to the first dielectric layer 1132. The first dielectric layer 1132 transmits the first color light to the second dielectric layer 1134. The second dielectric layer 1134 receives the first color light and reflects the first color light to the combined light output region 1128 in the first direction 1170.

Second color light is received by the substrate from the second color LED 1124 in a third direction 1174, and propagated to the first dielectric layer 1132. The first dielectric layer 1132 reflects the second color light to the second dielectric layer 1134. The second dielectric layer 1134 receives the second color light, and reflects the second color light to the combined light output region 1128 in the first direction 1170. Here, the first direction 1170 and the third direction 1174 are different because of the bent dichroic combiner 1104.

Third color light is received by the substrate from the third color LED 1126 in the first direction 1170, and propagated to the second dielectric layer 1134. The second dielectric layer 1134 transmits the third color light to the combined light output region 1128 in in the first direction 1170.

Optical block 1130 is shown in detail for the left side of the HMD 1100. In some embodiments, the right side of the HMD 1100 may also include an optical block. The optical block may include, among other things, an eye cup. LED assemblies 700 may also be included within the optical block. In some embodiments, the LED assemblies 700 disposed at a single edge of the LCD panel, such as the left edge as shown in FIG. 11. A weight or other component may be placed at the right edge to balance the HMD. In another example, the LED assemblies are arranged along the top and/or bottom edge, and bent toward the left and right eye cups of the HMD 1500. In another example, LED assemblies 700 are disposed at the left and right edges of the LCD panel.

Figure 12:
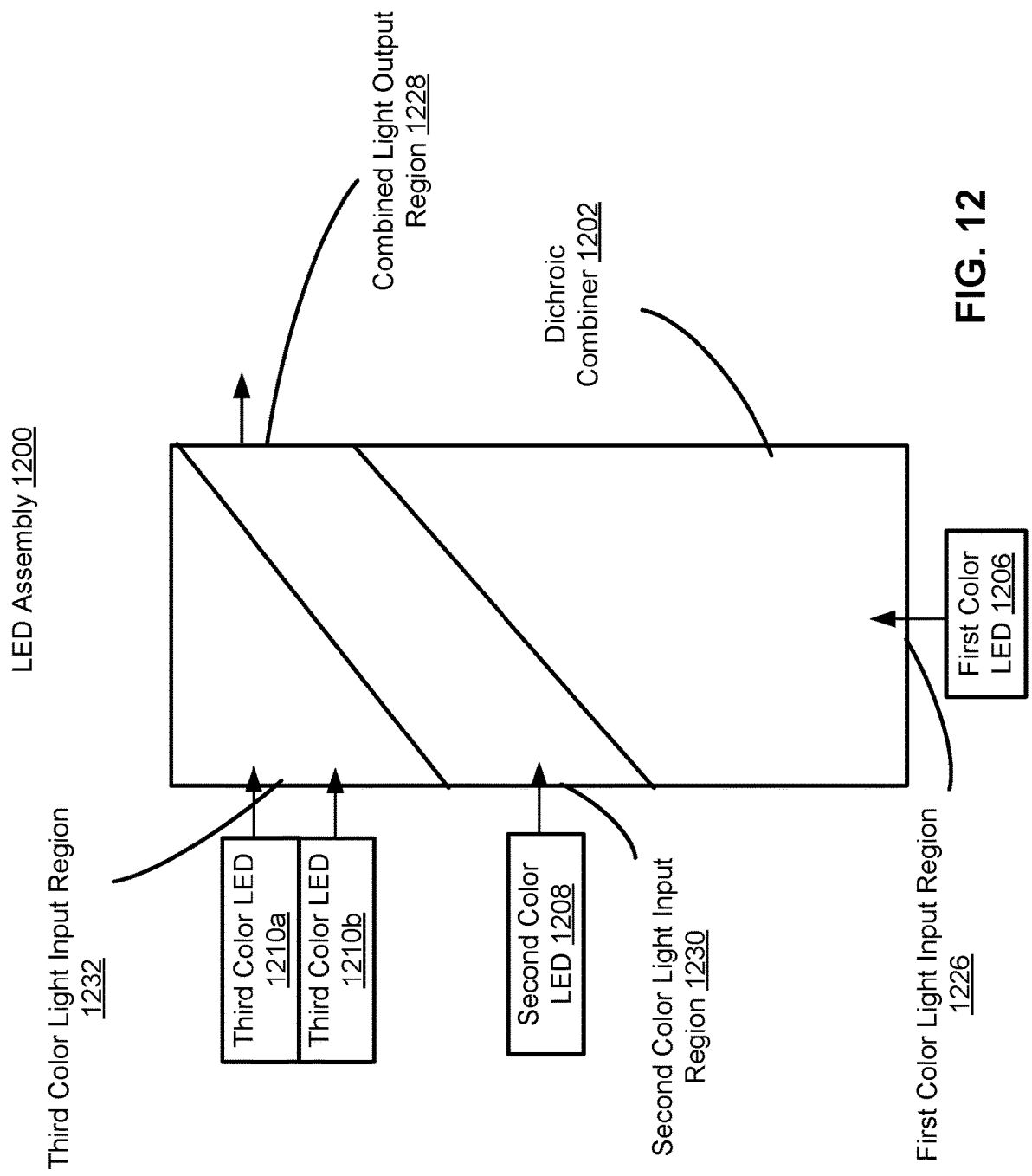
FIG. 12 shows an LED assembly including a dichroic combiner, in accordance with some embodiments.

FIG. 12 shows an LED assembly 1200 including a dichroic combiner 1202. The LED assembly 1200 includes multiple color LEDs of a single color. For example, LED assembly 1200 includes a first color LED 1206 (e.g., red), a second color LED 1208 (e.g., blue), and a third color LED 1210a (e.g., green). The LED assembly 1200 further includes an additional third color (e.g., green) LED 1210b. The two third color LEDs 1210a and 1210b provide third color light at the third color light input region 1232 of the dichroic combiner 1202. In general, additional colored LED (s) may be added to the LED assembly 1200 to produce the desired brightness and color gamut of combined light. For example, if the third color LED is a lower efficiency than the first and second color LEDs, then an additional third color LED may be added at the third color light input region 1232. The dichroic combiner 1202 combines the light from the color LEDs and superimposes the light at the combined light output region 1228. In general, additional color LED(s) may be added to the LED assembly 1200 to produce the desired brightness and color gamut of combined light.

Figure 13:
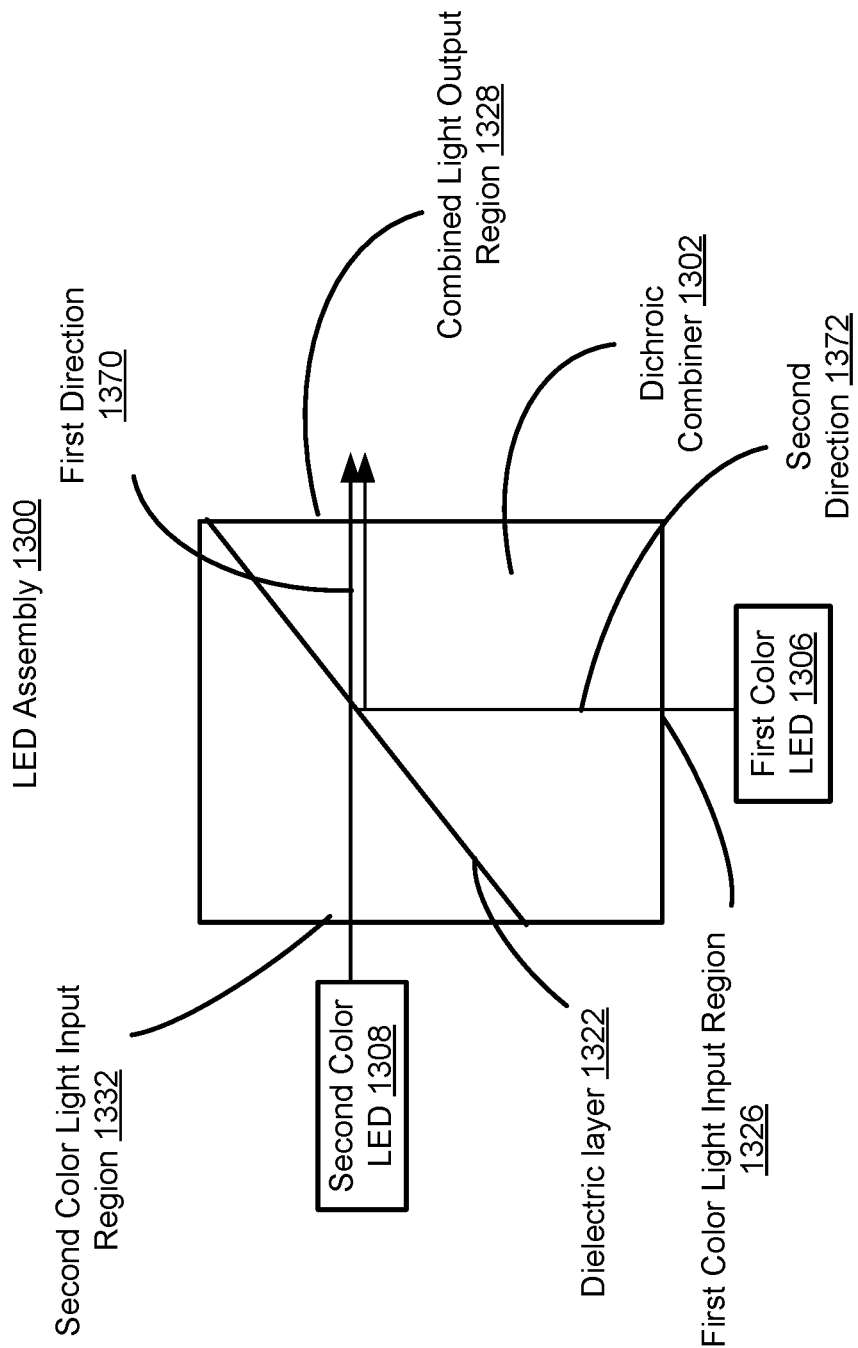
FIG. 13 shows an LED assembly including a dichroic combiner, in accordance with some embodiments.

FIG. 13 shows an LED assembly 1300 including a dichroic combiner 1302. The LED assembly 1300 is configured to combine light from two different color LEDs, such as first color LED 1306 and second color LED 1308, and output the combined light in a first direction 1370 at the combined light output region 1328. The dichroic combiner 1302 includes a single dielectric layer 1322 that receives the first light from the first color LED 1306 in a second direction 1372, and reflects the first light to the combined light output region 1328 in the first direction 1370. The dielectric layer 1322 receives second light from the second color LED 1308 in the first direction 1370, and transmits the second light to the combined light output region 1328 in the first direction 1370.

Control of LED Assemblies

FIG. 14 shows a flow chart of a process 1400 for controlling an LED assembly of a backlight, in accordance with some embodiments. Process 1400 can be performed by, for example, the controller 440 of an electronic display 155. In other embodiments, some or all of the steps may be performed by other entities. In addition, some embodiments may perform the steps in parallel, perform the steps in different orders, or perform different steps. In some embodiments, process 1400 may be performed to provide a strobed backlight where light sources are flashed on and off over time to provide illumination to a LCD panel.

At 1410, the controller 440 is configured to determine a first emission spectrum of a first color LED of an LED assembly and a second emission spectrum of a second color LED of the LED assembly. The backlight may be a strobed backlight to reduce motion blur, where the color LEDs are switched on and off over time.

The LED assembly includes two or more different color LEDs optically coupled with a dichroic combiner. In some embodiments, the LEDs include different color LEDs, such as a red, green, and blue LED. As discussed above, different color LEDs may include different emission spectrums, where spectrum intensity varies as a function of wavelength as shown in FIG. 6B.

At 1420, the controller 440 is configured determine a first emission response time of the first color LED and a second emission response time of the second color LED. Emission response time refers to a delay between an input current and light emission output for an LED. Different color LEDs may include different emission response times.

At 1430, the controller 440 is configured to control the first emission spectrum of the first color LED relative to the second emission spectrum of the second color LED. The controller 440 may be configured to optimize an emission spectrum of combined light for the backlight based on separately controlling the emission spectrums of the color LEDs. The controller generates separate intensity control signals for each type of color LED. For example, the current input into a lower efficiency color LED may be higher than the current input into a higher efficiency color LED, where a higher current increases the intensity of the emission spectrum. Thus the quality of the combined light output from the backlight is improved in terms of color gamut and/or brightness. In some embodiments, the emission spectrum of color LEDs is optimized such that differently colored light sources emit light with similar intensity at corresponding wavelengths, as shown by the spectrum plots 660A, 660B, and 660C in FIG. 6.

At 1440, the controller 440 is configured to control the first emission response time of the first color LED relative to the second emission response time of the second LED. The controller 440 may balance the emission response times of the color LEDs based on separately controlling input signals to the color LEDs. The separate light intensity control signals for each type of color LED may include timing offsets to balance different emission response times. For example, an input current to a color LED with a longer emission response time may be provided at an earlier time such that the timing of light emission output from the color LED matches the timing of light emission output from a second color LED having a shorter emission response time. Similarly, an input current to a color LED with a shorter emission response time may be provided at a later time such that the timing of light emission output from the color LED matches the timing of light emission output from a second color LED having a longer emission response time. In some embodiments, the controller 440 balances the emission response time for each of the color LEDs of an LED assembly.

In some embodiments, the controller 440 considers the angular and spectral response times of the dichroic combiner when controlling relative emission spectrums or response times of different color LEDs. The transmittance, reflectance and absorptance of the dielectric layers are functions of wavelength and angle of incidence of light. For example, a dielectric layer may transmit 95% of incident light intensity for blue wavelengths and 85% of incident light intensity for green wavelengths. The power of blue and green light output from the blue and green LEDs are adjusted in accordance with the lower efficiency transmission of the green light, such as by driving the green LED with a higher intensity than the blue LED to account for the difference in transmission efficiency. Similar adjustments may be performed for each dielectric layer that the light encounters in the dichroic combiner. The controller 440 determines the optical properties of the dielectric layers and/or dichroic combiner, such as via simulation or measurement.

In that sense, intensity control signals output from the controller 440 compensates for emission spectrum and emission response time differences between different color LEDs, resulting in a backlight with improved color gamut and brightness.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A display device, comprising:
a display panel; and
a backlight including:
an LED assembly including:
a first LED emitting a first light at a first wavelength;
a second LED emitting a second light at a second wavelength;
a third LED emitting a third light at a third wavelength; and
a dichroic combiner, including:
a substrate to propagate the first, second, and third light, the substrate including a polymer material, the substrate including: a first surface for receiving the first light from the first color LED; a second surface for receiving the second light from the second color LED; a third surface for receiving the third light from the third color LED; and a fourth surface for outputting the first, second, and third light at a first direction into a light guide for illuminating the display panel;
a first dielectric layer disposed within the substrate, the first dielectric layer configured to: receive the first light propagating at a second direction from the first surface of the substrate; transmit the first light propagating at the second direction to a second dielectric layer; receive the second light propagating at a third direction from the second surface of the substrate; and reflect the second light to propagate at the second direction to the second dielectric layer; and
the second dielectric layer disposed within the substrate, the second dielectric layer configured to: receive the first light propagating at the second direction from the first dielectric layer; reflect the first light to propagate at the first direction to the fourth surface; receive the second light reflected from the first dielectric layer propagating at the second direction; reflect the second light to propagate at the first direction to the fourth surface; receive the third light propagating at the first direction from the third surface of the substrate; and transmit the third light at the first direction to the fourth surface.

2. The display device of claim 1, wherein the first direction is the same as the third direction.

3. The display device of claim 1, wherein:
the first LED is a red LED, the second LED is a green LED, and the third LED is a blue LED;
the first light is red light, the second light is green light, and the third light is blue light;
the first dielectric layer transmits the red light and reflects the green light; and
the second dielectric layer to transmits the blue light and reflects the green light and the red light.

4. The display device of claim 1, wherein the dichroic combiner superimposes the first, second, and third light at the fourth surface.

5. The display device of claim 1, wherein:
the first dielectric layer is slanted at a first angle relative to the first direction; and
the second dielectric layer slanted at a second angle relative to the first direction.

6. The display device of claim 5, wherein the first angle is the same as the second angle.

7. The display device of claim 1, wherein:
the substrate includes substrate portions bonded to the first and second dielectric layers with an adhesive layer; and
the adhesive layer includes a refractive index that matches a refractive index of the substrate.

8. The display device of claim 7, wherein the adhesive layers include an optically clear adhesive and the first and second dielectric layers include a dielectric coating.

9. The display device of claim 1, wherein:
the substrate includes a first substrate portion including the first surface;
the substrate includes a second substrate portion including the second surface;
the substrate includes a third substrate portion including the third surface;
the first dielectric layer is disposed between the first substrate portion and the second substrate portion; and
the second dielectric layer is disposed between the second substrate portion and the third substrate portion.

10. The display device of claim 1, wherein:
the backlight includes a plurality of LED assemblies including dichroic combiners including fourth surfaces; and
the fourth surfaces of the dichroic combiners are disposed behind the display panel along one or more edges of the display panel.

11. The display device of claim 10, wherein:
the backlight is disposed behind the display panel;
the display device further includes an eye cup disposed in front of the display panel; and
the substrates of the plurality of LED assemblies are bent toward the eye cup.

12. The display device of claim 1, wherein the substrate homogenizes the first, second, and third light prior to output at the fourth surface.

13. The display device of claim 1, wherein at least one of the first dielectric layer or the second dielectric layer narrows emission spectrum bandwidth of the first light emitted from the first LED, the second light emitted from the second LED, or the third light emitted from the third LED.

14. The display of claim 1, wherein:
the first LED includes a first emission spectrum and the second LED includes a second emission spectrum; and
the display device further includes a controller configured to optimize an emission spectrum of the combined light based on controlling the first emission spectrum of the first LED relative to the second emission spectrum of the second LED.

15. The display device of claim 1, wherein:
the first LED includes a first emission response time and the second LED includes a second emission response time; and
the display device further includes a controller configured to control the first emission response time relative to the second emission response time.

16. A head-mounted display (HMD), comprising:
a display device, including:
a display panel; and
a backlight including:
an LED assembly including:
a first LED emitting a first light at a first wavelength;
a second LED emitting a second light at a second wavelength;
a third LED emitting a third light at a third wavelength; and
a dichroic combiner, including:
a substrate to propagate the first, second, and third light, the substrate including a polymer material, the substrate including: a first surface for receiving the first light from the first color LED; a second surface for receiving the second light from the second color LED; a third surface for receiving the third light from the third color LED; and a fourth surface for outputting the first, second, and third light at a first direction into a light guide for illuminating the display panel;
a first dielectric layer disposed within the substrate, the first dielectric layer configured to: receive the first light propagating at a second direction from the first surface of the substrate; transmit the first light propagating at the second direction to a second dielectric layer; receive the second light propagating at a third direction from the second surface of the substrate; and reflect the second light to propagate at the second direction to the second dielectric layer; and
the second dielectric layer disposed within the substrate, the second dielectric layer configured to: receive the first light propagating at the second direction from the first dielectric layer; reflect the first light to propagate at the first direction to the fourth surface; receive the second light reflected from the first dielectric layer propagating at the second direction; reflect the second light to propagate at the first direction to the fourth surface; receive the third light propagating at the first direction from the third surface of the substrate; and transmit the third light at the first direction to the fourth surface.

17. The HMD of claim 16, wherein the first direction is the same as the third direction.

18. The HMD of claim 16, wherein:
the first LED is a red LED, the second LED is a green LED, and the third LED is a blue LED;
the first light is red light, the second light is green light, and the third light is blue light;
the first dielectric layer transmits the red light and reflects the green light; and
the second dielectric layer to transmits the blue light and reflects the green light and the red light.

19. The HMD of claim 16, wherein:
the first dielectric layer is slanted at a first angle relative to the first direction; and
the second dielectric layer slanted at a second angle relative to the first direction.

20. The HMD of claim 16, wherein:
the substrate includes substrate portions bonded to the first and second dielectric layers with an adhesive layer; and
the adhesive layer includes a refractive index that matches a refractive index of the substrate.

21. The HMD of claim 16, wherein:
the substrate includes a first substrate portion including the first surface;
the substrate includes a second substrate portion including the second surface;
the substrate includes a third substrate portion including the third surface;
the first dielectric layer is disposed between the first substrate portion and the second substrate portion; and
the second dielectric layer is disposed between the second substrate portion and the third substrate portion.

22. The HMD of claim 16, wherein:
the backlight includes a plurality of LED assemblies including dichroic combiners including fourth surfaces; and
the fourth surfaces of the dichroic combiners are disposed behind the display panel along one or more edges of the display panel.

23. The HMD of claim 22, wherein:
the backlight is disposed behind the display panel;
the HMD further includes an eye cup disposed in front of the display panel; and
the substrates of the plurality of LED assemblies are bent toward the eye cup.

24. The display device of claim 1, wherein the substrate of the dichroic combiner is flexible.

25. The HMD of claim 16, wherein the substrate of the dichroic combiner is flexible.

* * * * *

UNITED STATES PATENT AND TRADEMARK OFFICE
CERTIFICATE OF CORRECTION

PATENT NO. : 10,712,775 B2
APPLICATION NO. : 15/370649
DATED : July 14, 2020
INVENTOR(S) : Evan M. Richards et al.

It is certified that error appears in the above-identified patent and that said Letters Patent is hereby corrected as shown below:

In the Claims

Column 18, Line 44, Claim 10, delete "surfaces;" and insert -- surface; --.

Column 18, Line 46, Claim 10, delete "surfaces" and insert -- surface --.

Column 18, Line 63, Claim 14, after "display" insert -- device --.

Column 20, Line 38, Claim 22, delete "surfaces;" and insert -- surface; --.

Column 20, Line 40, Claim 22, delete "surfaces" and insert -- surface --.

Signed and Sealed this
Fifth Day of January, 2021

Andrei Iancu
*Director of the United States Patent and Trademark Office*